Dec. 18, 1962   C. A. JOHNSTONE ETAL   3,068,755
APPARATUS FOR AND METHOD OF VARYING INITIAL VELOCITY OF
HEDGEHOG PROJECTOR CHARGES
Filed Aug. 1, 1952                                    4 Sheets-Sheet 1

INVENTORS
CHARLES A. JOHNSTONE
SIDNEY HERSH
MARVIN H. MEEKINS
LARRY SHILLER

BY

ATTORNEYS

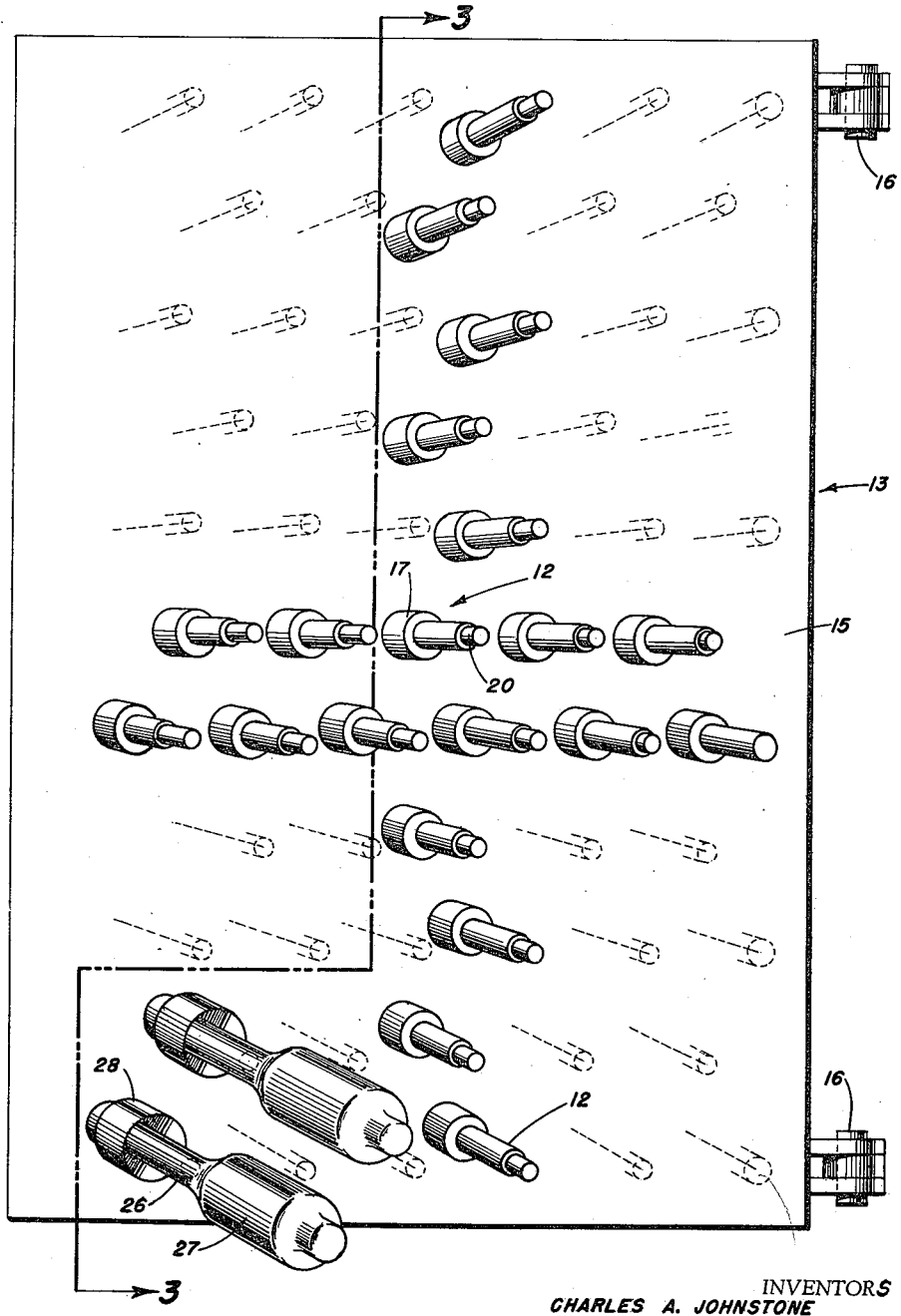

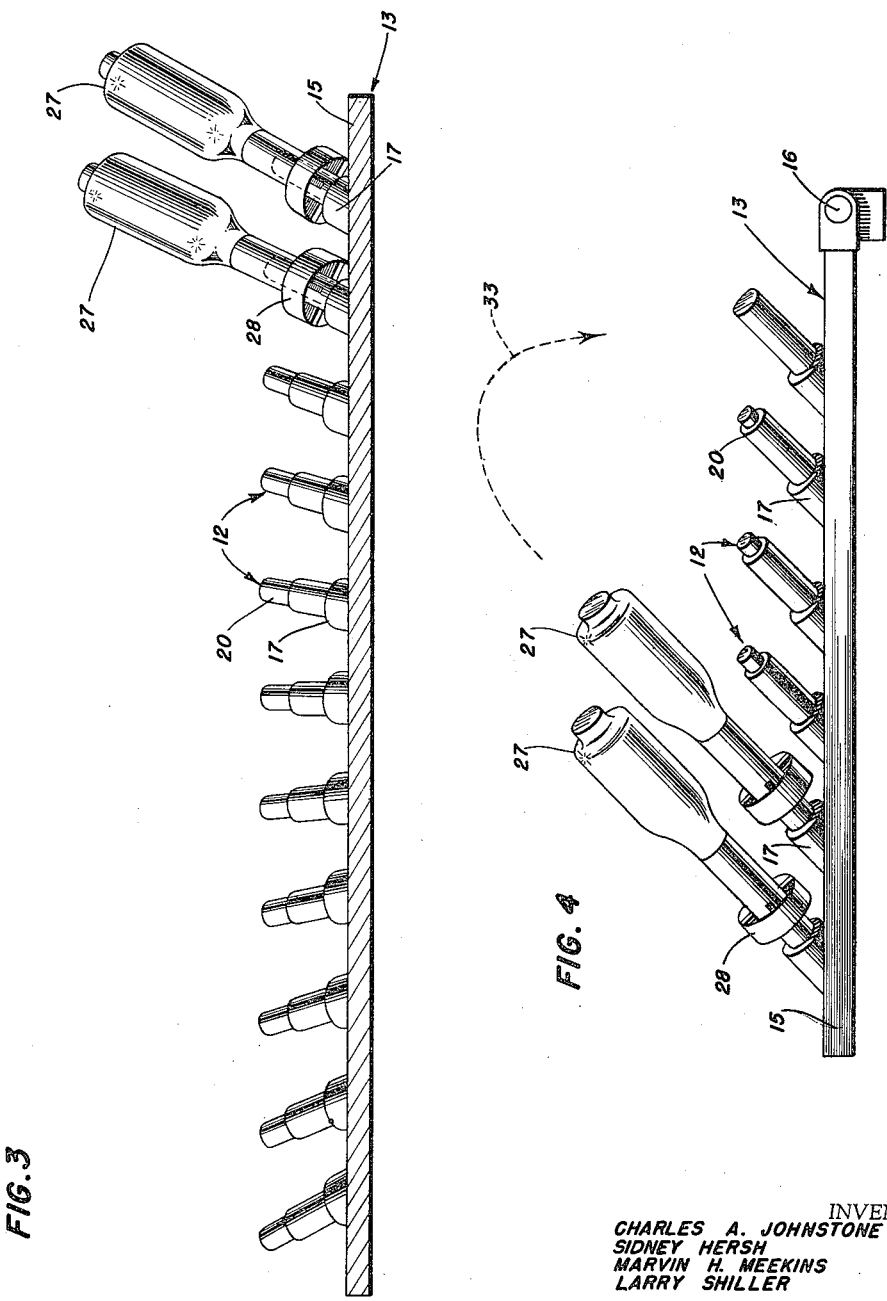

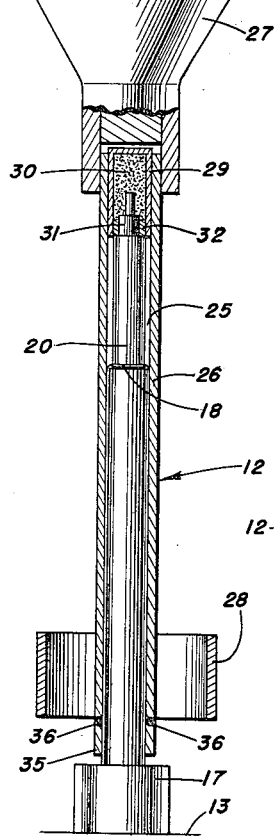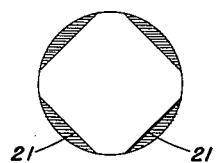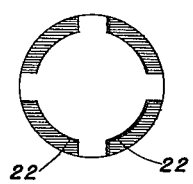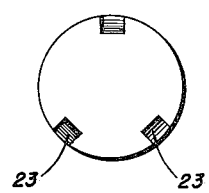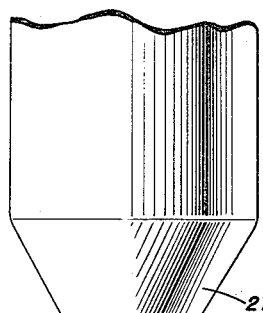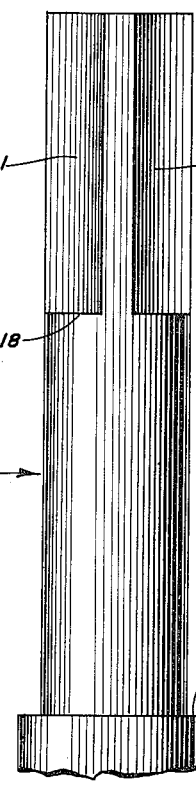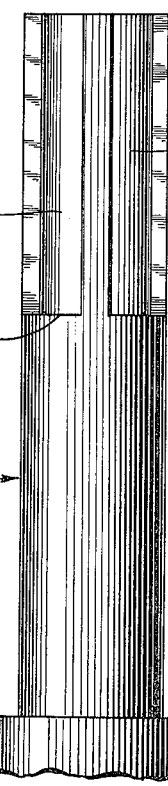
INVENTORS
CHARLES A. JOHNSTONE
SIDNEY HERSH
MARVIN H. MEEKINS
LARRY SHILLER

३,०६८,७५५

APPARATUS FOR AND METHOD OF VARYING INITIAL VELOCITY OF HEDGEHOG PROJECTOR CHARGES

Charles A. Johnstone, Arlington, Va., Sidney Hersh, Silver Spring, Md., Marvin H. Meekins, Falls Church, Va., and Larry Shiller, Silver Spring, Md., assignors to the United States of America as represented by the Secretary of the Navy
Filed Aug. 1, 1952, Ser. No. 302,284
4 Claims. (Cl. 89—1)
(Granted under Title 35, U.S. Code (1952), sec. 266)

The invention described herein may be manufactured and used by or for the Government of the United States of America for governmental purposes without the payment of any royalties thereon or therefor.

Said invention has for its general purposes to project an explosive charge pattern into the sea by use of a uniform pitch of all of the projector spigots in the vertical plane of the charge trajectory, and to produce said pattern by varying the initial velocity of the charges composing it. For an understanding of these purposes and of the terms used in conjunction with them, it is thought desirable to outline the type of warfare and armament concerned, even for the benefit of persons acquainted therewith.

In the waging of anti-submarine warfare a practice has been developed of dropping a number of explosive charges into the area of the sea under which an enemy submarine vessel is suspected of lurking. To be effective in damaging the vessel the charges are dispersed in a geometrical pattern, and the number of charges distributed over the pattern varies with the area desired to be covered.

The type of explosive charge used is, broadly, on the order of a rocket but since it lacks the characteristic powder grain which burns for an appreciable period while the rocket is in flight, cannot be embraced in that category. Specifically, the instant charge consists of an explosive warhead, detonated on contact, with a tail-tube of diminished diameter which is slid down on an upstanding spike or spigot to support the charge in the direction in which it is intended to be fired. A powder charge at the approxmate place where the tail-tube joins the case of the explosive warhead, but not connected in any way with the explosive charge, is ignited at the proper time. The expansion of gas between the inner closed end of the tail-tube and the adjacent end of the spigot gives the explosive charge the impetus which sends it on its trajectory.

This charge has gotten to be called a hedgehog, principally for the purpose of identification. The former manner of use of this hedgehog charge has had the disadvantages of a number of faults which are set out as follows. First, to lay the pattern of explosive charges according to the known apparatus and method, each charge was projected at the same initial velocity, in other words, the same propelling force behind each charge, and the dispersal of the charges was gotten by setting the spigots at such a variety of elevation angles that the desired pattern would be obtained. These elevation angles over the entire array of spigots were graded from low angles at the front to high angles at the back, and since the difference between maximum and minimum ranges was large the spread in spigot elevation angles was also large.

This elevation angle spread was from a minimum of 45° (low) for maximum range to approximately 70° (high) for minimum range. The low angle spigots had a relatively flat trajectory and shot farthest while the high angle spigots had a sharp, upwardly peaked trajectory and shot nearest to the ship. The high angles of elevation required for the short range spigots meant that if the ship should roll or pitch as much as 30° (not unusual in a rough sea) the rear charges would be fired in the neighborhood of 90° to the sea thus setting up the dangerous potentiality of the charges falling on the own ship's deck. This condition required the use of a mechanism to open the firing circuit in the event of such an abnormal elevation, so as to withhold fire.

Second, the firing angles of the foregoing short range spigots required a great degree of movement in train and elevation of the mount on which the spigots were fixed, in order to obtain stabilization against ship roll and pitch at the desired true angle of elevation and to achieve a mean impact point at a constant range from the ship. The consequently large and continuous movement of the mount in train and elevation required large power drives to insure the necessary stability.

Third, since the short range spigots were set at high angles of elevation the rounds from these spigots had a longer time of flight (were longer in the air) than did the rounds from the low angle long range spigots. In order to have all of the rounds arrive at the target at approximately the same time, it was necessary to fire the short range spigots first. The placing of the short range, high angle spigots at the back of the mount was required by space considerations producing, in its turn, another fault.

As appears below, the impelling powder charge has a closure to keep the powder in place. These closures are propelled out of the tail tubes as they leave the spigots. Since the firing was from the back toward the front of the mount, powder charge closures from rounds already fired would drop onto rounds just leaving the mount, would be struck thereby and thrown into the air in various directions and at considerable velocity, causing a missile hazard aboard the firing ship.

Fourth, the use of angles of elevation above 45° for all but the rounds with the longest ranges resulted in comparatively long times of flight and allowed more time than desirable for evasive maneuvers on the part of the submarine, before the charge pattern reached the depth of the submarine.

Fifth, with such a variety of angles of elevation for the spigots, it was possible to obtain a true angle for only one angle of elevation, namely that angle giving the mean point of impact, during roll and pitch. The charge impact pattern was distorted because of divergence of the other spigots, the amount of deviation for each round being dependent upon the degree of divergence of said other spigots from that spigot doing the firing of the round for the foregoing mean point of impact.

Without having to alter the hedgehog charge, these faults are overcome in the instant apparatus and method by setting all of the spigots of a bank of spigots at a common pitch in the vertical plane of the trajectories, and varying the initial velocity of the individual charges so that they will reach their intended places in the pattern. The latter principle is the important feature of the invention, and the standing of the spigots at the 45° elevation angle is an arrangement by which the charges are projected from the ship to the very best advantage. These, then are two of the objects of the invention and in amplification of the first the 45° angle of the spigots is lower than the average of the spread angles heretofore, deriving the advantage of requiring less train and elevation movement to keep the mount elevated at the desired true angle of elevation during ship's roll and pitch, and, consequently enabling the use of smaller power drives than before.

In amplification of the second-stated object, the initial impulse imparted to selected charges is regulated by so shaping the respective spigots as to permit escape of the entrapped impelling gas to atmosphere soon, late or somewhere intermediately after ignition of the powder charge producing it, in that way causing the affected charges to fall near, far or at places in between and so configurate the explosive pattern on the surface of the sea.

A third object, and one developing out of the principle of varying the initial velocity of the charges, is to so fire the bank of charges that they can arrange themselves like a canopy upon arrival at the target area and descend parallel, or substantially so, to the surface.

Other advantages derived from the achievement of those objects are set out as follows. The lower elevation angle adopted for the spigots results in an approximate maximum angle of 75° for all of them with a 30° ship's roll. Since at no time is it necessary to fire the mount with any of the spigots anywhere near 90° elevation, use can be made of a simple firing cutout cam to prevent firing at any angles above 75° elevation relative to the deck, thus protecting the ship from charges that under the former practice could be fired only to fall back on own ship's deck.

Using the shaped-spigot principle the long-range spigots, from which the charges have the longest time of flight, are fired first. With all of the spigots set at an angle of 45° to the deck, space considerations are not involved in the placement of the spigots, so the first-fired spigots are placed at the front of the mount. Firing then progresses from front to back of the mount, consequently powder charge closures dropping onto spigots from which rounds have already been fired are not thrown around the deck to injure personnel.

Since all of the spigots fire at 45° elevation, less time is required for the flight of those rounds that formerly were fired at an elevation over 45°. Thus there is a decrease in time available to a submarine for evasive maneuvers.

With all of them at 45° true elevation, the spigots become nearly parallel to each other, the only divergence from parallelism being due to flarings to right and left of center because of necessary differences in train angles. This uniform setting substantially decreases the amount of pattern distortion occurring during roll and pitch, inasmuch as the effort to stabilize the mount to hold the central spigot (the one whose round marks the mean point of impact) at its true angle of elevation also stabilizes the remaining spigots at their true elevations.

Acknowledgement is made of earlier attempts to arrive at the result outlined above but in no known instance has it been proposed to (a) lay an explosive charge on a target surface according to a planned, geometrical form, (b) to do so by means of a bank of charge projectors which are impelled at velocities so graded that the pattern achieves its form when immediately over the target area and substantially parallel thereto or (c) to regulate the throwing distances by so shaping the spigots themselves as to make the end of the tail tube the means for automatically venting the gas to atmosphere and thus fix the duration of the initial velocity of the hedgehog charges. This acknowledgement includes the U.S. patents to S. C. Davidson, 1,299,136 of April 1, 1919 and P. Van Deuren et al., 1,307,384 of June 24, 1919, and the British patent to Westinghouse-Leblanc, 125,612 of May 1, 1919.

Objects other than those stated and many of the attendant advantages of this invention will be readily appreciated as the same becomes better understood by reference to the following detailed description when considered in connection with the accompanying drawings wherein:

FIG. 2 is a plan view of the mount from which the hedgehog charges are impelled, only two of the charges being shown in place on the spigots;

FIG. 3 is a cross section taken on the line 3—3 of FIG. 2;

FIG. 4 is a side elevational of the mount;

FIG. 5 is a partially sectional and elevational view of one of the spigot and explosive charge assemblies;

FIGS. 6, 7 and 8 are side elevations showing modified types of spigot cut-backs by which the method of varying the initial velocity of the charges, and FIGS. 9, 10 and 11 are end elevations of the foregoing respective spigots.

Figure 1:
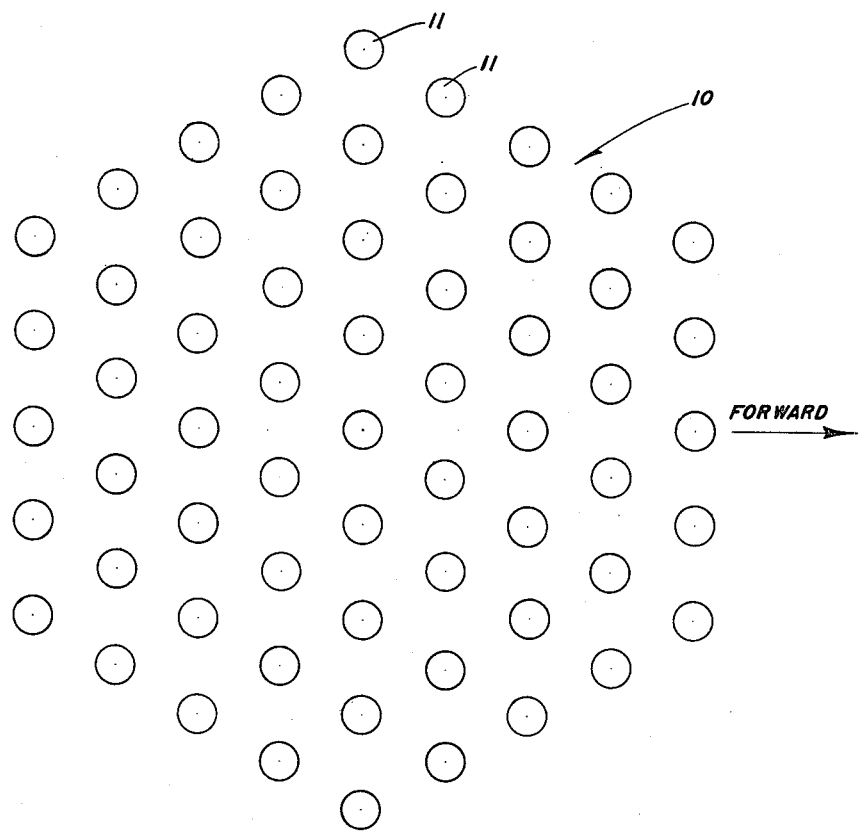
FIG. 1 is a diagram illustrating the configuration of a typical explosive pattern of bursts on the target surface.

In the drawings, the planned impact pattern is generally designated 10 (FIG. 1). The bursts 11, in other words the places where the projected charges explode, are spaced on adequately-distanced centers. The nearest bursts, that is nearest to the ship, have a minimum range of approximately 500 feet, and the range for the bursts farthest from the ship is determined by the sum of the minimum range plus the distance between the rows of bursts in the direction of firing. These approximations are made solely to convey an idea of the coverage contemplated on the surface of the sea or other target area, and as far as the principles of the invention are concerned the distances between burst-spots and the range of the pattern from the ship have little if any significance.

The pattern 10 results from orienting the spigots 12 of the mount 13 (FIG. 2) as hereinbefore outlined. The spigots are not necessarily attached to the platform 15 shown herein, because the method of varying the initial velocity of the projector charges could be accomplished by an array of spigots set in concrete at or near sea-shore. Such an installation, however, lacks the mobility of a ship, and out of consideration of the facility of building the mount in the factory as a unit the platform 15 is shown as the foundation on which the spigots are precisely fixed for the design of pattern desired.

Said platform is to be regarded in a broad sense, whether it consists of a concrete or equivalent base on land, or the deck of a ship. Its showing as a separate element is done solely to add the idea of individual mobility since it is by means of the hinges 16 that the array of spigots can be raised or lowered in reference to the deck, thus to allow for the operation of drive mechanism to compensate for pitch and/or roll, depending on how the mount is emplaced on the deck.

When viewed from either side of the mount, all of the spigots 12 will be seen to stand at an elevation angle of 45° to the platform (FIG. 4). When viewed in plan (FIG. 2) and from the rear (FIG. 3) the flaring that progresses from the center out toward the sides is apparent. This flaring is necessary to fill out the pattern 10 in the lateral directions, and constitutes the only divergence from parallelism of the spigots.

Each spigot 12, and the immediate description is confined to one, consists of a metal spike which at one end, the bottom end, is set in a boss 17. The other and free end is shaped in all cases to produce a shoulder 18 (FIGS. 5, 6, 7 and 8), the location of which in respect to the height of the spigot establishes the instant in the flight of the charge when the initial velocity ceases.

In FIG. 5, and others of the views, the shaping consists of cylindrically reducing the spigot at 20 to produce the shoulder 18. In FIGS. 6 and 9 the shaping consists of flats 21, one or more, produced by milling or any other known mechanical process. In FIGS. 7 and 10 the spigot is cut out at 22, and in FIGS. 8 and 11 the grooves 23 provide the gas-escape passageways which, manifestly, is the same case in the other forms. The foregoing shaping is responsible for the term cut-back for that formation of the end of the spigot that produces the gas-escape shoulder and gas chamber 25 shown in FIG. 5.

The advantage of the types of cut-backs in FIGS. 6, 7 and 8 over the annulus type in FIG. 5 is that when the missile is impelled off of the spigot in FIG. 5 the tail tube loses the stabilizing influence of the spigot when its trailing edge 35 leaves the shoulder 18. This is a consideration in the ballistics of the missile, although minor in nature, but in each of the types in FIGS. 6, 7 and 8 this fault does not occur. The splines remaining after the formation of the cut-backs insures the stabilization of the tail tubes full length of the spigots.

Said chamber is produced when the tail tube 26 is slid down on the spigot until it rests thereon. The tail tube extends back from the missile 27, the explosive (hedgehog) charge mentioned above, and has a shroud ring 28 which forms a boundary around a number of radiating stabilizing fins. At the place where the tail tube joins the missile 27 there is a metal case 29 with a charge of powder 30 which, when ignited, produces gas pressure in the chamber 25 to project the missile off of the spigot. The tail tube has a seal at 36 to prevent the escape of the gas, the details of the gas seal being omitted.

A detonator 31 is electrically energized to explode the impelling powder charge. This detonator is carried by a closure 32 which also serves to retain the powder. It is this closure which falls free when the tail tube leaves the spigot and, according to the practice prior to the invention, was struck by other missiles and thrown around the deck. The significance of the last statement is understandable from FIG. 4. When firing from rear to front, as was the former practice, the closures would fall (arrow 33) into the path of the missile next forward and thus be thrown, as stated. But when firing from front to rear, as is the new practice, the closures fall (same arrow) into missile spaces previously vacated.

The operation of the invention is briefly reviewed. It has been pointed out that now the firing of the missiles occurs on a wave progressing from front (right, FIG. 4) to rear. The spigot cut-backs are graded from zero in the front row (right, FIG. 2) to full-depth cut-back in the back row. When there is no cut-back the gas of the impelling powder charge cannot escape until the tail tube 26 has traveled full length of the spigot and its trailing edge 35 (FIG. 5) separates at the upper end of the spigot. Consequently full advantage is taken of the confined gas expansion of the gas in the chamber 25, and the missile is driven to the remote reaches of the pattern (right side, FIG. 1).

When there is maximum cut-back as in the back row the trailing edge 35 of the tail tube will arrive at the shoulder 18 (FIG. 5) relatively soon, thereupon to release the impelling gas to atmosphere early in the time cycle. This cuts off the impulse upon the missiles in the back row so that they will fall at the near side of the pattern (left side, FIG. 1). By varying the initial velocity of the missiles of the entire bank in this manner, the spots will fall in the pattern form shown in FIG. 1. By extension of the idea, any type of pattern can be configurated by properly locating the spigots and grading the cut-backs from zero to maximum.

The purpose of firing from front to rear is to produce a cover or blanket of explosive charges and to cause the cover to set itself into substantial parallelism to the target surface by the time of its arrival immediately over said surface. Thus the whole blanket drops down upon the surface as a unit, and any charge within its area striking the submarine will explode upon impact and so impress its effect on the target.

As already stated, this result is obtained by firing from front to rear of the bank. The missiles which have the longest trajectories, hence must remain in the air longest, are given the greatest initial velocity. On the other hand, the missiles which have the shortest trajectories, hence remain in the air the least time, are given the least initial velocity.

If, by any chance, the grading of the cut-backs were reversed, to put the greatest cut-back in the front row and zero cut-back in the rear row, the front missiles would arrive over the target area ahead of the rear missiles. The explosive cover would then be on a slant, the low side nearest the ship and the high side farthest away. Since any missile explodes only on contact, it follows that as the missile cover sinks front edge-first the submarine might drive away from under the cover as fast as the latter slips into the sea, with a consequently much reduced chance of being struck by one of the missiles.

There is some virtue to remarking again that each of the missiles contains an identically potential impelling powder charge. There is no necessity of seeing to it that certain missiles are emplaced on only certain spigots. Any run of missiles will achieve the intended method, the graded cutting back of the spigots determining how soon or how late the impelling gas shall be let out, thus to cut off the initial impulse behind the missiles.

Obviously many modifications and variations of the present invention are possible in the light of the above teachings. It is therefore to be understood that within the scope of the appended claims the invention may be practiced otherwise than as specifically described.

What is claimed is:

1. In apparatus for projecting explosive devices onto a target area, the combination of a missile having a tail tube, a spigot having a cylindrical body fixed at one end to support a missile when the tail tube thereof is positioned thereon, a plurality of mutually spaced oppositely disposed flat surfaces formed on the other end of said cylindrical body and terminating at their junction with said body, a plurality of oppositely disposed gas-impinging shoulders formed by said body and flat surfaces respectively at said junction of the body and the flat surfaces, a plurality of arcuate surfaces on said body and disposed between and bordering on said flat surfaces and extending along the entire length thereof, said flat surfaces, arcuate surfaces and shoulders providing a plurality of sealed gas chambers when the tail tube is positioned on said spigot, sealing means on said tail tube in engagement with said cylindrical body for maintaining the tube in sealing engagement with the body until the tube moves past said shoulders and into engagement with the flat and arcuate surfaces, and means including a propelling charge carried by the tail tube for supplying gas pressure into the sealed chambers and against the gas impinging shoulders with sufficient force to propel the missile from the spigot.

2. A launching rod for supporting an explosive device, the combination of a missile having a tail tube in a firing position when the tail tube of the missile is positioned on the rod, a cylindrical body portion, a boss formed on one end of said body portion and fixedly supporting the rod, means defining a plurality of oppositely disposed recesses formed on the other end of said rod, said means including a plurality of tube engaging elements disposed between and contiguous with said recesses, a plurality of gas impinging shoulders formed by said body portion and recessed respectively at the junction of the body portion and said recesses, said recesses, tube engaging elements and shoulders providing a plurality of sealed pressure chambers when the tail tube is positioned on said rod in engagement with the body portion and said tube engaging elements, a sealing gasket on said tail tube at one end thereof in engagement with the cylindrical body for maintaining a sealing connection therebetween until the tube moves past said shoulders and into engagement with said elements, and means including a propelling charge carried by the tube at the other end thereof for supplying gas pressure to the chambers and against the shoulder with sufficient force to propel the missile from the rod.

3. In apparatus for projecting explosive devices, the combination of a missile having a tail tube, an elongated rod having a cylindrical body fixed at one end to support a missile when the tail tube thereof is positioned thereon, means defining a plurality of oppositely disposed recesses formed in the other end of said body and terminating at their junction with said body, a plurality of oppositely disposed gas impinging shoulders formed by said body and recesses at said junction of the body and the recesses, a plurality of arcuate surfaces on said body and disposed between and bordering on said recesses and extending along the entire length thereof, said recesses, arcuate surfaces and shoulders providing a plurality of sealed chambers when the tail tube is positioned on said rod in engagement with the body and said arcuate surfaces, a sealing gasket on the tail tube at one end thereof in engagement with the cylindrical body for maintaining a sealing connection therebetween until the tube moves past the gas impinging shoulder, and means including a propelling charge at the other end of the tube for supplying gas pressure into the chambers and against the shoulders with sufficient force to propel the missile from the rod.

4. In apparatus for projecting explosive devices onto a target area from the desk of a ship, the combination of a platform pivoted at one end thereof for angular movement to compensate for the pitch and roll of a ship, an array of launching rods mounted on said platform in mutually spaced rows, each of said launching rods having a cylindrical body at one end and a free end portion at the other end thereof, the free end portion in each row varying in length with respect to the length of the free end portion in the preceding row, a missile supported on each launching rod and having an elongated tail tube partially in engagement with the free end portions and in sealing engagement with the cylindrical bodies, sealing means provided at one end of each tail tube, a boss formed on each cylindrical body and fixedly connected to said platform for angular movement therewith, recess means on each free end portion in each row forming a plurality of gas-expansion chambers of varying capacities according to the length of the free end portions when the tail tubes are in sealing engagement with the cylindrical bodies and in partial engagement with the free end portions thereof, a plurality of gas-impinging shoulders on each free end portion and cooperating with one of each of said plurality of the gas-expansion chambers, means including a propelling charge carried by each of the tail tubes at one end thereof for supplying constant pressure to the chambers and against said shoulders sufficiently to propel the missiles from the launching rods, and means carried by each of the tail tubes in sealing engagement with their respective cylindrical bodies for maintaining a sealing connection therebetween until said sealing means have moved past said shoulders.

References Cited in the file of this patent

UNITED STATES PATENTS

| | | |
|---|---|---|
| 314,036 | Marvin | Mar. 17, 1885 |
| 1,307,384 | Van Deuren et al. | June 24, 1919 |
| 1,336,656 | Rogozea | Apr. 13, 1920 |
| 1,721,704 | Madaschi | July 23, 1929 |
| 2,399,248 | Patrick | Apr. 30, 1946 |

FOREIGN PATENTS

| | | |
|---|---|---|
| 125,612 | Great Britain | May 1, 1919 |
| 303,267 | Germany | Apr. 20, 1920 |
| 308,476 | Germany | Oct. 29, 1920 |
| 832,464 | France | July 4, 1938 |